United States Patent [19]
Harzer

[11] 3,733,549
[45] May 15, 1973

[54] SYSTEM FOR MEASURING INSTANTANEOUS FREQUENCY VALUES

[75] Inventor: Peter Harzer, Eningen, Germany

[73] Assignee: Wandel u. Goltermann Elektronische Prazisionsmessgerate, Reutlingen, Germany

[22] Filed: Apr. 10, 1972

[21] Appl. No.: 242,462

[30] Foreign Application Priority Data

Apr. 10, 1971 Germany..................P 21 17 737.7

[52] U.S. Cl. ................................................324/79 D
[51] Int. Cl.................................................Goir 23/14
[58] Field of Search ....................324/79; 235/92 FQ

[56] References Cited
UNITED STATES PATENTS 2,821,702   1/1958   Russell............................324/79 R X
3,059,187   10/1962  Jaffe..............................324/79 R UX Primary Examiner—Alfred E. Smith
Attorney—Karl F. Ross

[57] ABSTRACT

An incoming oscillation, whose frequency during a brief reading interval is to be determined, is converted into a first pulse train of cadence $f$ to be compared with the cadence $f'$ of an astable multivibrator responsive to a stored control voltage. During the reading interval the control voltage is modified by a signal depending upon the difference of the two cadences until the same are identical; during an adjoining extended storage period, the modified control voltage keeps the multivibrator operating at the unknown cadence $f$ which is then measured by a binary counter.

11 Claims, 7 Drawing Figures

SYSTEM FOR MEASURING INSTANTANEOUS FREQUENCY VALUES

My present invention relates to a system for measuring the instantaneous value of an unknown frequency such as that of an incoming oscillation which is present for a brief interval only or whose variable frequency is of interest only during such interval.

In commonly owned U.S. Pat. No. 3,486,112, for example, there has been disclosed an amplitude-measuring system having means for periodically switching between a fixed calibrating frequency and a variable test frequency which therefore is available only for a limited time.

The general object of my invention is to provide means for dependably ascertaining the magnitude of the frequency exhibited by such an incoming oscillation during a brief reading interval, i.e., an interval lasting for not more than a few cycles of that frequency.

A more particular object is to provide means in such a system enabling the visualization and/or registration of such frequency reading in digital form.

These objects are realized, in accordance with the present invention, by the provision of a pulse former which responds to the incoming oscillation and generates a first pulse train of a repetition frequency or cadence $f$ related to the oscillation frequency; in a simple case, cadence $f$ is identical with the frequency of the incoming oscillation, though it could also be a multiple or a fraction of that frequency. A variable oscillator, advantageously an astable multivibrator with a voltage-responsive impedance such as a varactor in its timing circuit, generates a second pulse train of a repetition frequency or cadence $f'$, this cadence being determined by a control variable such as a voltage stored in a frequency-determining network which during the reading interval is connected to a frequency comparator receiving the two pulse trains and deriving from them a signal modifying the stored control variable in response to the difference of their cadences $f$ and $f'$ until this difference disappears. The value thus established is preserved, during an extended period following the reading interval, in the storage circuit of the frequency-determining network, this extended period being thus available for the actuation of a pulse counter which is then connected to the variable oscillator for determining the value of cadence $f'$ matching that of cadence $f$ as detected during the reading interval.

The output signal of the frequency comparator advantageously depends on the relative phasing of the two pulse trains of cadences $f$ and $f'$. The necessary phase comparison may be carried out with logical circuitry including one or more coincidence (AND, NAND or NOR) gates controlling a source of direct current whose polarity is made dependent upon the relative lag or lead of corresponding pulses of the two trains. Such a current source may comprise a pair of gates controlled by a flip-flop settable and resettable by respective pulses of the aforementioned trains; it could also include a conventional frequency discriminator serving for the coarse setting of the multivibrator frequency supplemented by a fine-setting stage consisting essentially of an integrator for phasing voltages derived from the relative timing of the multivibrator output and the incoming pulse train.

The above and other features of my invention will be described in detail hereinafter with reference to the accompanying drawing in which.

Figure 1:
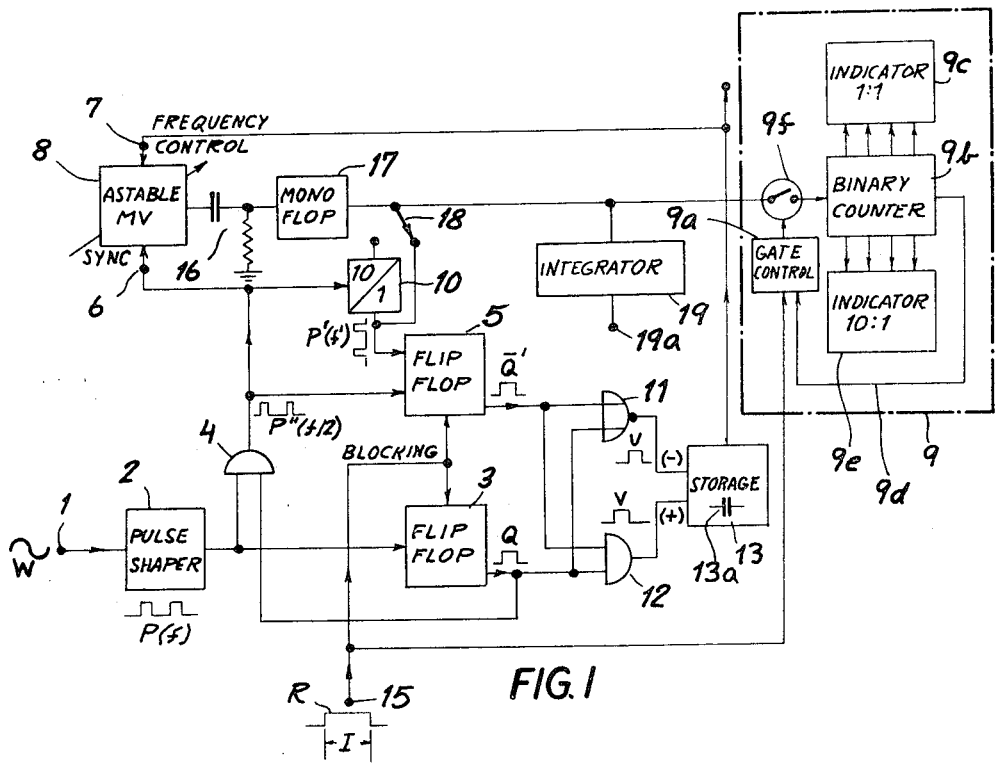
FIG. 1 is a block diagram of a frequency-measuring system embodying my invention.
Figures 3, 4:
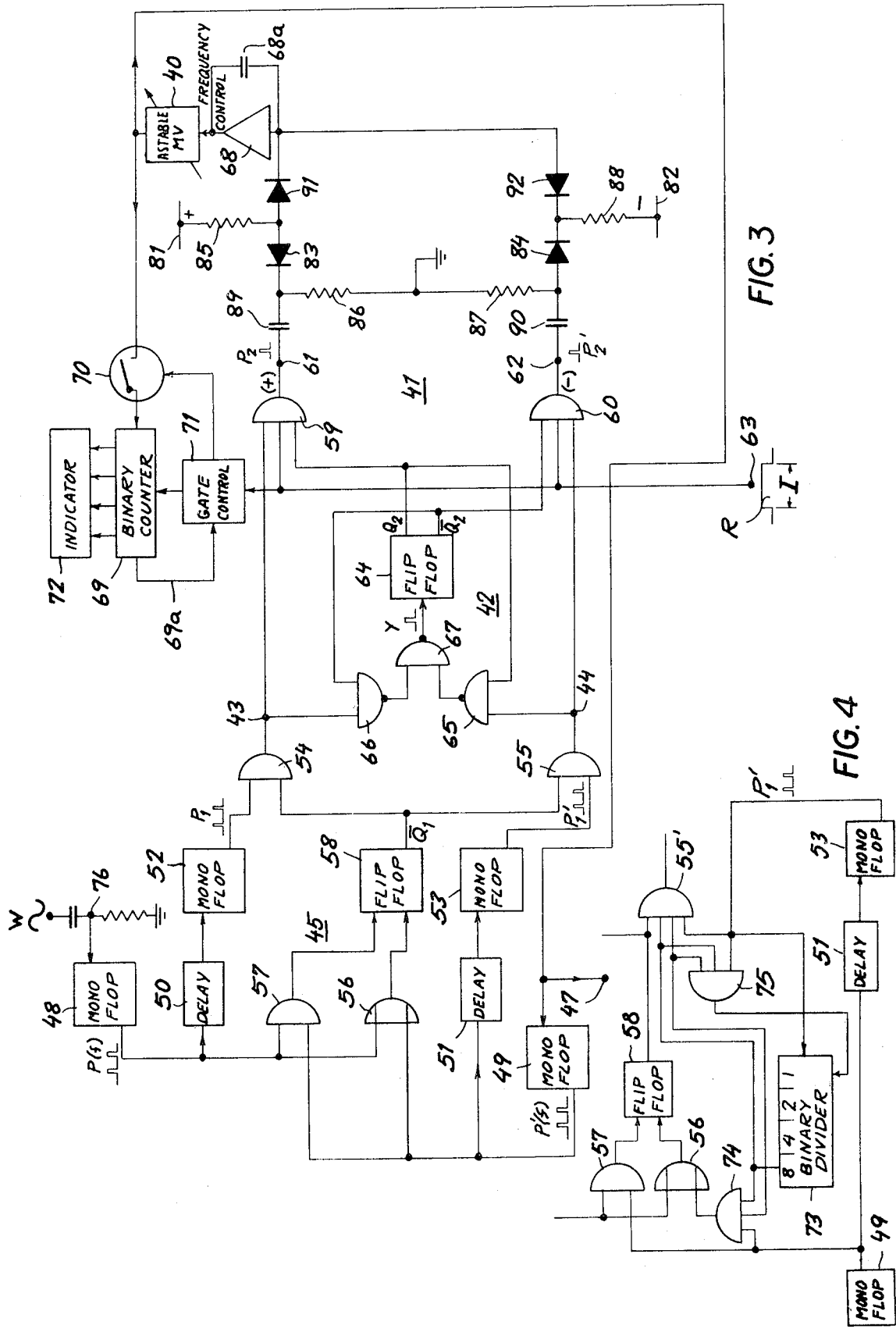
FIG. 3 is a more detailed diagram of a further embodiment.
FIG. 4 is a fragmentary circuit diagram illustrating a modification of the system of FIG. 3.

The system shown in FIG. 1 has an input terminal 1 carrying an incoming oscillation or wave W of a frequency $f$ whose value during a brief reading interval is to be measured. Oscillation W is fed into a pulse shaper 2 which may include a differentiation circuit and a monoflop, e.g. as shown in FIG. 3 described hereinafter, and which generates a train of pulses P of constant width and of a cadence $f$ identical with the frequency of that oscillation. Pulse shaper 2 feeds a common switching input of a flip-flop 3 and, in parallel therewith, reaches one input of an AND gate 4 whose other input is tied to the normally de-energized set output of that flip-flop. A terminal 15 may be energized, manually or otherwise, with a reading pulse R for a brief interval I to unblock the flip-flop 3 and a companion flip-flop 5 which are normally blocked in their reset condition. AND gate 4 works into a resetting input of flip-flop 5 and also into a synchronizing input 6 of an astable multivibrator 8 whose operating frequency is variable by a voltage applied to a control input 7 thereof. The output of multivibrator 8, differentiated in a circuit 16, periodically triggers a monoflop 17 generating a train of uniform pulses P' of a cadence $f'$. These pulses P' are fed to a setting input of flip-flop 5, via a switch 18 which in its illustrated position establishes a direct connection to that input; if the operating frequency of multivibrator 8 is substantially higher than the expected frequency $f$ of incoming wave W, switch 18 may be reversed to channel the output of monoflop 17 to the setting input of flip-flop 5 by way of a frequency divider 10 which has a step-down ratio of $k{:}1$ (here specifically 10:1) and which is resettable by a pulse P'' from AND gate 4 together with flip-flop 5. In either case, therefore, cadence $f'$ of the setting pulses P' for flip-flop 5 will be in the general range of the cadence $f$ of the incoming pulses P. Since flip-flop 3 is set by the trailing edges of the first, third etc. pulses P, AND gate 4 is unblocked only for alternate pulses of this train so that resetting and synchronizing pulses P'' have a cadence $f/2$. Thus, flip-flop 5 is set by pulses P' interleaved with pulses P'' which cause it to be reset concurrently with flip-flop 3.

The pulses appearing on the set output of flip-flop 3 and on the reset output of flip-flop 5 have been designated Q and $\overline{Q}'$, respectively. Pulse Q, aside from unblocking the gate 4, reaches one input each of a NOR gate 11 and an AND gate 13 both having their second inputs energized by pulse $\overline{Q}'$. The outputs of gates 11 and 12 carry respective signal pulses U and V applied to a discharging input (−) and a charging input (+) of a circuit 13 provided with a storage capacitor 13a; details of such a circuit will be described hereinafter with reference to FIG. 3. The charge stored in circuit 13 is transmitted to control input 7 of multivibrator 8 as well as to a monitoring terminal 14 from which it may be delivered to a voltmeter giving an analog reading of frequency $f$; if the connections between gates 11, 12 and circuit 13 where reversed so that this voltage were inversely rather than directly proportional to the unknown frequency, such an analog reading would still be available from a terminal 19a connected to the output of monoflop 17 through an integrator 19.

A measuring stage 9 comprises an electronic gating switch 9f provided with a control circuit 9a which in turn responds to the voltage on terminal 15 so as to keep that switch open during the reading interval I. At other times the switch 9f applies the output pulses of monoflop 17 to a binary counter 9b working into a visual indicator 9c, preferably of the decadic type. Counter 9b includes a timer, not shown, driving the gate-control circuit 9a via a lead 9d so as to hold the switch 9f closed for a period of fixed duration, or for a series of such periods, as is well known per se; the number of pulses registered by the counter during this period is then displayed on indicator 9c. If switch 18 is in its illustrated position, i.e., if divider 10 is not used, indicator 9c gives the true reading of cadence $f'$; with divider 10 in operation, an alternate indicator 9e is employed whose reading is the corresponding fraction $1/k$ (here one-tenth) of the recurrence rate of the monoflop pulses.

Figure 5:
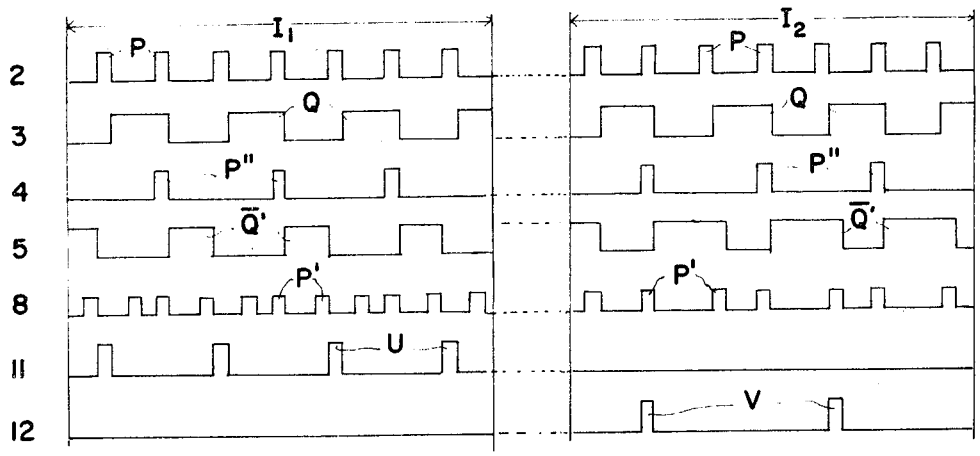
FIGS. 5, 6 and 7 are sets of graphs relating to the operation of the systems of FIGS. 1, 2 and 3, respectively.

The operation of the system of FIG. 1 will be better understood from FIG. 5 showing pulses P, P', P'', Q, $\overline{Q}'$, U and V on graphs designated by numerals identifying their sources, e.g. "2" in the case of pulses P originating at shaping circuit 2; monoflop 17 is considered part of multivibrator 8 so that the latter designation has been used as the origin for pulses P'. The width of pulses P, P', P'' has been exaggerated with reference to their spacing.

Let it be assumed that, during a first reading interval $I_1$, the cadence $f'$ of the locally generated pulses P' is higher than the cadence $f$ of pulses P derived from incoming wave W. The trailing edge of the first pulse P arriving after the unblocking of flip-flops 3 and 5 sets the flip-flop 3 and also clears the gate 4 which is unblocked by the simultaneously generated pulse Q. Thus, a pulse P'' comes into existence in the next cycle to reset the flip-flop 5, which was previously set by a pulse P' from the free-running multivibrator 8, and to trip the latter so that the trailing edges of pulses P, Q, P' and P'' coincide with the leading edge of the next pulse $\overline{Q}'$. The simultaneous absence of pulses Q and $\overline{Q}'$ unblocks the NOR gate 11 to produce one or more pulses U, AND gate 12 being blocked so that pulse V is absent. The discharging input (−) of storage circuit 13 is therefore energized; as a result, the charge of storage capacitor 13a is diminished so that the operating frequency of multivibrator 8 is reduced to make the cadence $f'$ equal to cadence $f$. This assimilation of the two pulses cadences is usually accomplished after a small number of cycles. Pulses P'', coinciding with pulses P', override these setting pulses to reset the flip-flop 5.

Let us now consider a reading interval $I_2$ in which the cadence $f$ of pulses P is greater than the cadence $f'$ of pulses P'. In this case the flip-flop 3 is reset before the setting of flip-flop 5 so that pulses Q and Q' overlap in one or more cycles, giving rise to a charging pulse V in the output of AND gate 12. As a result, the charge of storage capacitor 13a is increased to raise the operating frequency of multivibrator 8.

Storage circuit 13 includes integrating means for pulses U and V as described below with reference to FIGS. 2 and 3.

Figure 2:
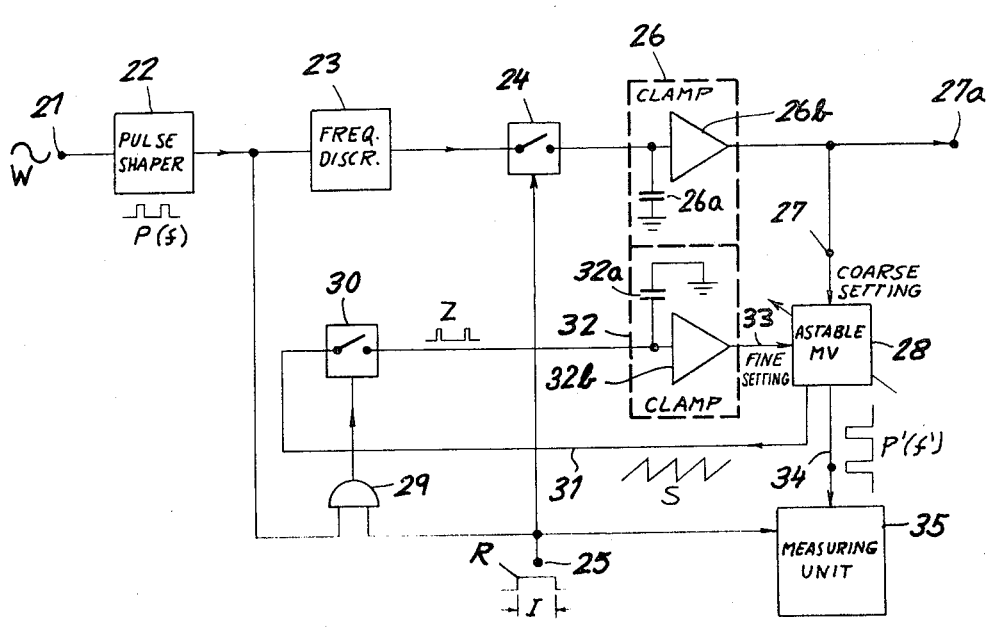
FIG. 2 is a diagram similar to FIG. 1, showing another embodiment.

In the system of FIG. 2 the incoming wave W is applied to an input terminal 21 of a pulse shaper 22 similar to unit 2 of FIG. 1. This pulse shaper, again emitting a pulse train P of cadence $f$, works into an input of an AND gate 29 and in parallel therewith into an integrating frequency discriminator 23 generating an output voltage proportional to that cadence. A gating switch 24, opened during a reading interval I by a pulse R applied to a terminal 25 by way of a manual key or the like, normally transmits the output voltage of discriminator 23 to a clamping circuit 26 including a storage condenser 26a and an amplifier 26b. The amplified voltage stored on condenser 26a is applied to a coarse-setting input 27 of an astable multivibrator 28 (whose output circuit may include a differentiator and a monoflop as shown at 16, 17 in FIG. 1) and in parallel therewith to a monitoring terminal 27a to provide an analog indication of pulse cadence $f$. Multivibrator 28 has a main output lead 34, carrying the pulses P' of cadence $f'$, and an ancillary output lead 31 on which a sawtooth voltage S appears; voltage S, whose frequency is identical with cadence $f'$, is generated inside the multivibrator in conventional manner with the aid of, for example, a capacitor charged at a constant rate and discharged periodically by the leading (or trailing) edges of pulses P'. Sawtooth voltage S is fed through another gating switch 30 to a clamping stage 32 which resembles stage 26 and includes a storage condenser 32a and an amplifier 32b working into a fine-setting input 33 of multivibrator 28. Pulses P' are delivered to a measuring unit 35 which is generally similar to component 9 of FIG. 1 and includes a binary counter disconnected from lead 34 during the reading interval I. Terminal 25, receiving the reading pulse R, is further connected to the second input of AND gate 29 whose output closes the sampling gate 30 only momentarily, during interval I, in the presence of pulses P whose width is a small fraction of that interval. Upon such closure, the momentary value of sawtooth voltage S is transmitted as a phasing pulse Z to clamping stage 32 for integration and storage.

Figure 6:
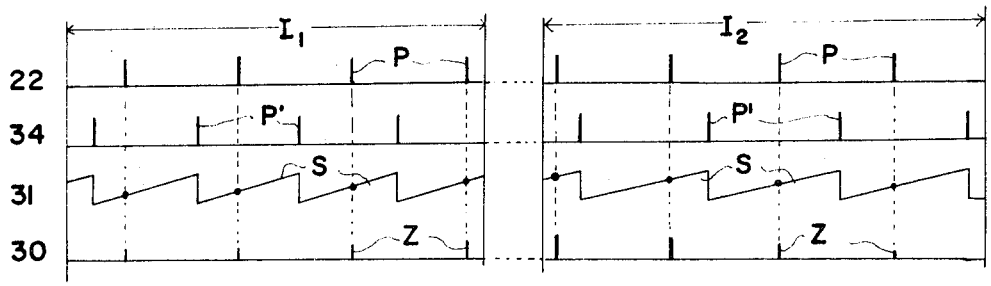

The operation of the system of FIG. 2 will be best understood with reference to FIG. 6 which shows on graphs 22 and 34 the pulses P and P', along with sawtooth voltage S shown on a graph 31. Depending upon the relative phasing of pulse trains P and P', pulse P will coincide with a larger or smaller amplitude of sawtooth wave S so as to give rise to pulses Z (graph 30) of different height. During interval $I_1$, when the operating frequency $f'$ of the roughly preset multivibrator 28 is higher than the cadence $f$ to be determined, pulses P progressively lag behind pulses P' in successive cycles of wave W so that the magnitude of phasing pulses Z tends to rise above the mean value of sawtooth voltage S with the result that fine-setting input 33 is relatively strongly energized to reduce the operating frequency of multivibrator 28. During interval $I_2$, when the multivibrator frequency and therefore the pulse cadence $f'$ is less than the unknown cadence $f$, pulses P progressively lead the pulses P' so that the cumulative value of pulses Z stored on condenser 32a is relatively low. This increases the operating frequency of multivibrator 28 until parity is achieved between cadences $f$ and $f'$.

Again, the assimilation of the two cadences can be realized in a few pulse cycles.

Since the output voltages of clamping stages 26 and 32 have opposite effects upon the multivibrator frequency, terminals 27 and 33 may be considered the equivalent of the charging and discharging inputs (+) and (−) of FIG. 1 and may be connected to the multivibrator proper through a storage circuit similar to circuit 13.

The system shown in FIG. 3 is generally similar to that of FIG. 1 in that the relative phasing of two pulse trains P and P′ of the incoming wave W and the output of a free-running multivibrator is determined by a phase sensor including coincidence gates and flip-flops. A pulse shaper, which is the equivalent of components 2 and 22 shown in FIGS. 1 and 2, comprises a monoflop 48 periodically triggered by an incoming wave W fed to it through a differentiation circuit 76; with the use of a full-wave rectifier ahead of circuit 76 the cadence $f$ of the pulses P issuing from monoflop 48 would be twice the frequency of wave W. In an analogous manner the output of an astable multivibrator 40 is applied to a monoflop 49 via a nonillustrated differentiation circuit included in that multivibrator to produce the second pulse train P′ of cadence $f'$; the output of the multivibrator also energizes a monitoring terminal 47 for utilization in an analog indicator through the intermediary of a low-pass filter or integrator as shown at 19 in FIG. 1.

The operating frequency of multivibrator 40 is determined by the output of a storage circuit 41 provided with a charging input 61 (+) and a discharging input 62 (−) corresponding to the similarly designated inputs of storage circuit 13 in FIG. 1. Circuit 13 comprises a balanced network connected between a positive bus bar 81 and a negative bus bar 82, this network including diodes 82, 84 and resistors 85, 86, 87, 88. Input terminal 61 is connected to the junction of diode 83 and resistor 86 through a capacitor 89; similarly, terminal 62 is connected to the junction of diode 84 and resistor 87 through a capacitor 90. Two further diodes 91 and 92 connected back-to-back with diodes 83 and 84 lead to the input of an integrating amplifier 68 whose feedback capacitor 68a forms part of the storage capacitance diagrammatically indicated at 13a in FIG. 1. The frequency-determining element of multivibrator 40 has been schematically illustrated in FIG. 3 as a varactor controlled by the output of integrating amplifier 68.

Terminals 61 and 62 are served by two AND gates 59 and 60 with three inputs each. The middle input of each gate is tied to a control terminal 63 receiving the reading pulse R in whose presence the gate is blocked. The same reading pulse opens, in the manner described with reference to FIG. 1, a gating switch 70 between multivibrator 40 and a binary counter 69 through the intermediary of a control circuit which also responds to a timing signal from inside the counter on a lead 69a. Counter 69 again actuates a preferably decadic indicator 72.

Another input of gate 59 is fed from monoflop 48 through a delay line 50, a further monoflop 52 and an AND gate 54. In an analogous manner, monoflop 49 energizes an input of gate 60 through a delay line 51, a monoflop 53 and an AND gate 55. The off-periods of monoflops 52 and 53 are shorter than those of monoflops 48 and 49 so that the delayed pulses $P_1$ and $P_1'$ fed to gates 54 and 55 are substantially shorter than the original pulses P and P′. Outputs 43 and 44 of AND gates 54 and 55 also lead to a phase comparator 42 comprising a differential flip-flop 64, the switching input of this flip-flop being energizable from these outputs by way of respective NAND gates 66, 65 in cascade with a common NAND gate 67. NAND gate 65, whose first input is tied to output 44 of gate 65, has a second input connected to an output of flip-flop 64 carrying a signal $Q_2$ when the flip-flop is set; the same signal $Q_2$ is applied to the third input of AND gate 59. Similarly, AND gate 66 has a first input tied to output 43 of gate 54 and has a second input connected to an output of flip-flop 64 which is energized with a signal $\overline{Q}_2$ in the reset state of the flip-flop, signal $\overline{Q}_2$ being also applied to the third input of gate 60.

The remaining inputs of AND gates 54 and 55 are connected to a reset output of a flip-flop 58 which forms part of a blocking stage 45 and produces a signal $\overline{Q}_1$ when this flip-flop is reset. The setting input of flip-flop 58 is connected to the output of an AND gate 57 receiving on its two inputs the pulses P and P′ from monoflops 48 and 49; its resetting input is energizable by these same pulses through an OR gate 56.

The purpose of blocking stage 45 is to prevent the transmission of pulses $P_1$ and $P_1'$ whenever pulses P and P′ coincide or overlap; under all other conditions, differential flip-flop 64 responds to the successive occurrences of two or more pulses of the same train to switch into one or the other of its binary states.

If a pulse P appears in the output of monoflop 48 without an accompanying pulse P′, AND gate 57 does not conduct but OR gate 56 passes the pulse to reset the flip-flop 58 if it had previously been set. Signal $\overline{Q}_1$ then unblocks AND gates 54 and 55 so that pulse $P_1$ can reach junction 43. In like manner, a pulse P′ from monoflop 49 unaccompanied by a pulse P causes the unblocking of gates 54 and 55 so that the corresponding pulse $P_1'$ is transmitted to junction 44. If, however, both pulses P and P′ are simultaneously present, AND gate 57 57 generates a setting pulse which overrides the resetting pulse from OR gate 56 and cancels the signal $\overline{Q}_1$ so that gates 54 and 55 are blocked.

If the flip-flop 64 is reset, i.e., if a signal $\overline{Q}_2$ in its output unblocks the gate 60 (in the presence of a reading pulse R), one of the inputs of NAND gate 66 is energized so that this gate has a finite output of logical value "1." With AND gate 55 not conducting, NAND gate 65 has a like finite output whereby NAND gate 67 is cut off. The appearance of a pulse $P_1$ at junction 43 under these circumstances deactivates the gate 66 whereupon NAND gate 67 generates a pulse Y which, however, switches the flip-flop 64 only by its trailing edge. The next pulse $P_1$, therefore, will be able to pass the AND gate 59 which has now been unblocked by a signal voltage $Q_2$ from the set output of flip-flop 64; on the other hand, a pulse $P_1'$ immediately following the pulse $P_1$ cannot clear the gate 60 which is blocked in the absence of voltage $Q_2$. By the same token, the first pulse $P_1'$ following one or more pulses $P_1$ generates another switching pulse Y which resets the flip-flop 64 by its trailing edge so that any immediately following pulse or pulses $P_1'$ can traverse the gate 60. Thus, phase comparator 42 has no output as long as pulses $P_1$ and $P_1$ occur alternately, which is true over a prolonged period only if their cadences $f$ and $f'$ are identical. If they are not, at least two consecutive pulses from the same train will eventually appear within a cycle of the other train to generate either a pulse $P_2$ at charging input 62 or a pulse $P_2'$ at discharging input 62.

Figure 7:
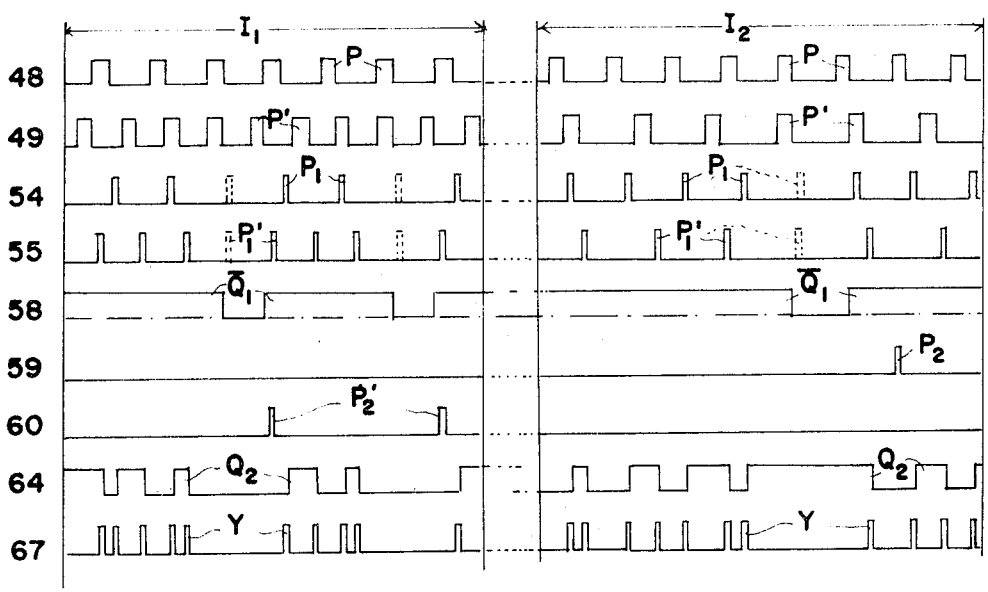

The operation of the system of FIG. 3 will be better understood from FIG. 7 showing the pulse trains P, P', $P_1$, $P_1'$, $\overline{Q}_1$, $P_2$, $P_2'$, $Q_2$ and Y on graphs labeled 48, 49, 54, 55, 58, 59, 60, 64 and 67, the dotted pulses of graphs 54 and 55 representing those which are blocked at AND gates 54 and 55 by the flip-flop 58. It will be seen that, during reading interval $I_1$ in which the cadence $f'$ of pulses P' is higher than the cadence $f$ of pulses P, only the gate 69 conducts intermittently to transmit a pulse $P_2'$ to the discharging input 62 of storage circuit 41, whereas during interval $I_2$ the opposite situation obtains and a pulse $P_2$ passes through gate 59 to the charging input 61 of that circuit. The resulting modification of the operating frequency of multivibrator 40 again assimilates the cadence $f'$ of the locally generated pulse train P' to the cadence $f$ of the pulse train P derived from the incoming wave W. Counter 69 is driven, as before, in the period following the reading interval I to register the magnitude of the multivibrator frequency as established by the control voltage stored in circuit 41.

FIG. 4 illustrates a partial modification of the system of FIG. 3 enabling the multivibrator 40 to operate at a frequency exceeding by an order of magnitude the unknown frequency of the incoming oscillation. In this instance the monoflop 49 does not directly feed the gate 56 but is connected thereto through another AND gate 74 having two further inputs connected to the first and fourth stages of a binary frequency divider 73 which is stepped by monoflop 53. These same stages are also connected to additional inputs of an AND gate 55', replacing the gate 55 of FIG. 3, and to two inputs of a further AND gate 75 receiving the pulses $P_1'$ on a third input. The two divider stages referred to, of decimal values 1 and 8, respectively, are simultaneously loaded only once during every 10 cycles of incoming pulses $P_1'$; every 10th stepping pulse restores the divider to zero through AND gate 75. Thus, only one out of 10 pulses $P_1'$ reaches the gates 55' and 56, with the same effect as the corresponding pulses in FIG. 3. Indicator 72 is, of course, suitably modified in this case to register only every 10th operating cycle of multivibrator 40.

I claim:

1. A system for measuring the frequency of an incoming oscillation existing during a brief reading interval, comprising:

pulse-forming means responsive to said incoming oscillation for generating a first pulse train of a frequency $f$ related to the frequency of said oscillation;

adjustable oscillator means for generating a second pulse train of a variable frequency $f'$;

frequency-determining means for said oscillator means;

frequency-comparison means connected to said pulse-forming means and to said oscillator means for producing a control variable for said oscillator means tending to equalize said frequency $f'$ to said frequency $f$;

storage means in said frequency-determining means for preserving said control variable during an extending period following said reading interval;

gating means operable to connect said storage means to an output circuit of said frequency-comparison means during said reading interval for modifying said control variable in accordance with the frequency difference between said pulse trains; and pulse-counting means connected during said extended period to said oscillator means for determining said frequency $f'$ as a measure of said frequency $f$.

2. A system as defined in claim 1 wherein said frequency-comparison means comprises a generator of modifying signals for said control variable responsive to the relative phasing of the pulse of said first and second pulse trains.

3. A system as defined in claim 2 wherein said oscillator means comprises an astable multivibrator provided with pulse-sharpening means for keeping constant the width of the pulses of said first pulse train, said pulse-forming means including a pulse shaper for keeping constant with the width of the pulses of said second pulse train.

4. A system as defined in claim 3, further comprising synchronizing means controlled by said gating means for periodically triggering said multivibrator from said pulse shaper to establish intermittent coincidence between pulses of said first and second pulse trains.

5. A system as defined in claim 3 wherein said generator of modifying signals comprises a differential flip-flop switchable only by consecutive pulses of the same pulse train.

6. A system as defined in claim 5 wherein said frequency-comparison means includes blocking means for suppressing coincident pulses from said first and second pulse trains.

7. A system as defined in claim 6 wherein said blocking means includes logical circuitry for generating a blocking signal in response to coincident pulses and an unblocking signal in response to noncoincident pulses, and a pair of pulse gates controlled by said blocking and unblocking signals.

8. A system as defined in claim 7 wherein said logical circuitry is effective to generate said blocking and unblocking signals on the trailing edges of said pulses, said blocking means further including delay means for retarding said pulses on their way from said logical circuitry to said pulse gates.

9. A system as defined in claim 2 wherein said oscillator means comprises an astable multivibrator with a main output carrying said second pulse train and with an ancillary output carrying a sawtooth wave in step with said second pulse train; said storage means comprising a first clamping circuit connected to a coarse-setting input of said multivibrator and a second clamping circuit connected to a fine-setting input of said multivibrator; said frequency-comparison means comprising a frequency discriminator connected by said gating means during said reading interval between said pulse-forming means and said first clamping circuit, for delivering to the latter a first control voltage substantially proportional to said frequency $f$, and circuit means controlled by said gating means and said pulse-forming means for sampling said sawtooth wave upon the occurrence of each pulse of said first pulse train for delivering to said second clamping circuit a second control voltage depending upon the phase relationship of said first pulse train and said sawtooth wave.

10. A system as defined in claim 1 wherein the operating frequency of said oscillator means is a multiple $kf'$ of said frequency $f'$, further comprising frequency-dividing means inserted between said oscillator means and said frequency-comparison means with a step-down ratio equal to $k$.

11. A system as defined in claim 1, further comprising integrating means connected to said oscillator means for deriving from said second pulse train a monitoring signal of a magnitude substantially proportional to said frequency $f'$.

* * * * *